US012640036B2

(12) United States Patent
Kashiwakura et al.

(10) Patent No.: US 12,640,036 B2
(45) Date of Patent: May 26, 2026

(54) INFORMATION PROCESSING DEVICE AND METHOD FOR PROVIDING MOBILITY-AS-A-SERVICE

(71) Applicant: TOYOTA JIDOSHA KABUSHIKI KAISHA, Toyota (JP)

(72) Inventors: Toshiki Kashiwakura, Tokyo (JP); Chihiro Inaba, Tokyo (JP); Shoi Suzuki, Tokyo (JP); Tsuyoshi Okada, Nagoya (JP); Yasuhiro Kobatake, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/896,105

(22) Filed: Sep. 25, 2024

(65) Prior Publication Data

US 2025/0218296 A1 Jul. 3, 2025

(30) Foreign Application Priority Data

Dec. 28, 2023 (JP) ................................. 2023-223177

(51) Int. Cl.
*G08G 1/127* (2006.01)
*H04W 4/021* (2018.01)

(52) U.S. Cl.
CPC .................................... *G08G 1/127* (2013.01)

(58) Field of Classification Search
None
See application file for complete search history.

(56) References Cited

U.S. PATENT DOCUMENTS

2022/0038844 A1* 2/2022 Kyle ........................ B60Q 1/50
2024/0068826 A1* 2/2024 Nagata ............... G01C 21/3461

FOREIGN PATENT DOCUMENTS

JP 2023-050629 A 4/2023

* cited by examiner

*Primary Examiner* — John F Mortell
(74) *Attorney, Agent, or Firm* — SoraIP, Inc.

(57) ABSTRACT

An information processing device including a notification unit and a control unit, wherein the control unit performs an operation including: predicting a dwell time of a bus vehicle stopped at a bus stop; and notifying, a following vehicle traveling behind the bus vehicle of information on traveling of the bus vehicle including the dwell time via the notification unit.

17 Claims, 4 Drawing Sheets

INFORMATION PROCESSING DEVICE AND METHOD FOR PROVIDING MOBILITY-AS-A-SERVICE

CROSS-REFERENCE TO RELATED APPLICATION

This application claims priority to Japanese Patent Application No. 2023-223177 filed on Dec. 28, 2023, incorporated herein by reference in its entirety.

BACKGROUND

1. Technical Field

The present disclosure relates to information processing devices.

2. Description of Related Art

There has been disclosed a notification system that notifies pedestrians or vehicles other than an autonomous vehicle that is going to pass through a predetermined traffic area of whether the pedestrians or the vehicles can proceed, or alerts the pedestrians or the vehicles, according to the behavior of the autonomous vehicle (e.g., Japanese Unexamined Patent Application Publication No. 2023-050629 (JP 2023-050629 A)).

SUMMARY

When a bus vehicle is stopped at a bus stop, a following vehicle approaching the bus vehicle from behind does not know the situation of the bus vehicle such as when the bus vehicle is going to depart the bus stop, and it is difficult for the following vehicle to determine whether to pass the bus vehicle. As a result, the following vehicle may pass the bus vehicle unsafely, which puts the bus vehicle and the following vehicle in a dangerous situation in terms of traffic safety.

In view of the above circumstances, an object of the present disclosure is to convey the situation of a bus vehicle to a following vehicle.

An information processing device according to an embodiment of the present disclosure is an information processing device including a notification unit and a control unit.

The control unit is configured to perform an operation including predicting a dwell time of a bus vehicle stopped at a bus stop, and notifying a following vehicle traveling behind the bus vehicle of information on traveling of the bus vehicle including the dwell time via the notification unit.

According to the embodiment of the present disclosure, the situation of the bus vehicle can be conveyed to the following vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
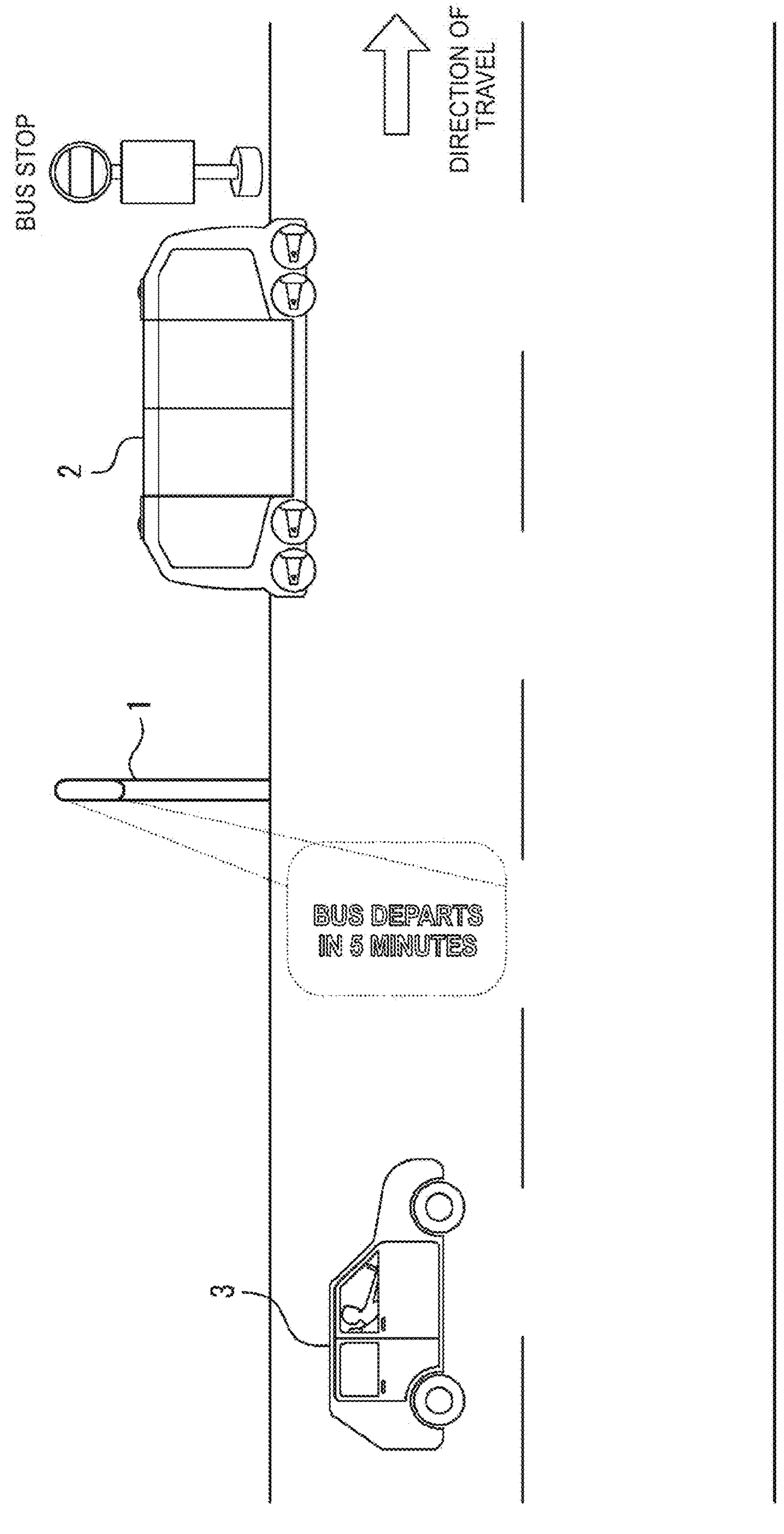
FIG. 1 is a diagram illustrating an example of use of an information processing device according to the present embodiment.

FIG. 1 is a diagram illustrating an example of use of an information processing device 1 according to the present embodiment. As illustrated in FIG. 1, the information processing device 1 notifies the following vehicle 3 traveling behind the bus vehicle 2 of information on traveling of the bus vehicle 2 stopped at a bus stop. As an embodiment, FIG. 1 illustrates an example in which the information processing device 1 predicts a dwell time at a bus stop of the bus vehicle 2. An example is shown in which the information processing device 1 notifies the following vehicle 3 of the predicted dwell time as one of the information on traveling of the bus vehicle 2 by displaying a message "the bus departs in 5 minutes" on the road surface, but the present disclosure is not limited thereto. As an embodiment, FIG. 1 illustrates an example in which the information processing device 1 is installed on a road surface by a road on which the bus vehicle 2 and the following vehicle 3 travel, but the present disclosure is not limited thereto. The information processing device 1 may be installed at an arbitrary place near a road, for example, a roof of a bus stop with a roof, or installed in a bridge or a gate-shaped column passed over an upper portion of the road. In FIG. 1, an example in which the information processing device 1 is installed between the bus vehicle 2 or the bus stop and the following vehicle 3 is illustrated, but the present disclosure is not limited thereto. The following vehicle 3 may be any vehicle that travels behind the bus vehicle 2, and includes, for example, an automobile, a motorcycle, a motorized bicycle, and a light vehicle.

Although the bus vehicle 2 in the present embodiment is described based on being an autonomous vehicle, the bus vehicle 2 may be a bus vehicle driven by a driver. For the following vehicle 3, it is recognized that the bus vehicle driven by the driver is not forced to depart because the driver is a professional. On the other hand, there is a sense of anxiety in the following vehicle 3 that the autonomous bus vehicle may suddenly start moving. According to the present disclosure, when the bus vehicle 2 is an autonomous vehicle, the information processing device 1 eliminates the anxiety caused by the autonomous driving of the bus vehicle 2, and further makes it possible to create a sense of security of the following vehicle 3. An example of the form of the bus vehicle 2 in the present embodiment is as follows, for example.

- A bus vehicle with one entrance/exit (in this case, an alighting passenger getting off first and then a boarding passenger getting on next).
- A bus vehicle with two entrances/exits, one for boarding and one for alighting (in this case, boarding and alighting occur simultaneously).
- A bus vehicle that performs only boarding or alighting (in this case, the bus vehicle is, for example, a shuttle bus or a pick-up bus). In the process to the final destination, there are only boarding or alighting passengers, and boarding and alighting will not occur simultaneously on the way.
- A bus vehicle in which a reservation system capable of making a reservation for getting on and off the bus vehicle is introduced (in this case, information on the number of people getting on and off the reservation can be acquired in advance).

Figure 2:
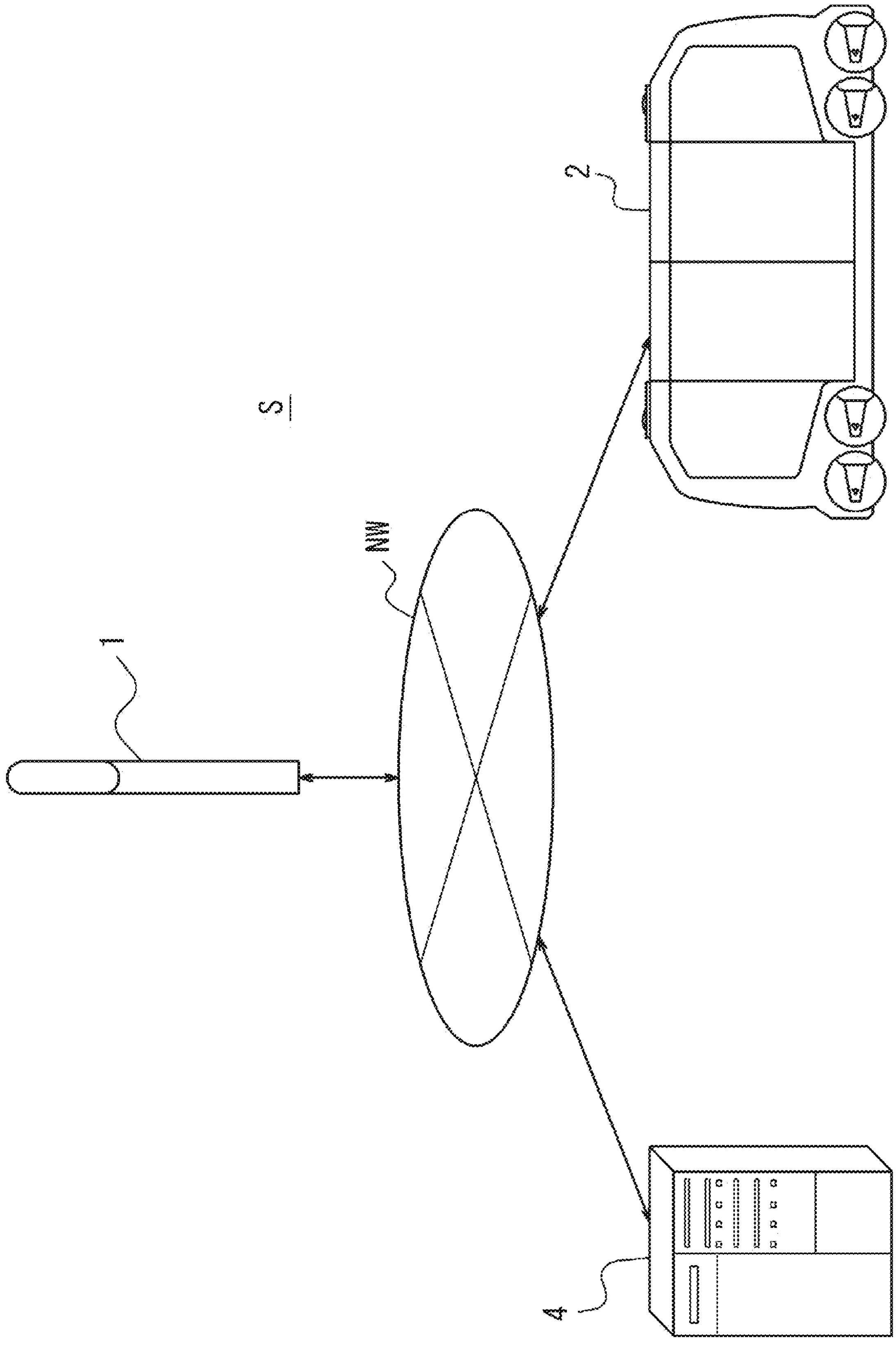
FIG. 2 is a schematic diagram of an information processing system according to the present embodiment.

FIG. 2 is a schematic diagram of the information processing system S according to the present embodiment. The information processing system S may be capable of communicating with the information processing device 1, the bus vehicle 2, and the control server 4 via a network NW. The network NW includes, for example, a mobile communication network, the Internet, or a fixed communication network.

In FIG. 2, one information processing device 1, one bus vehicle 2, and one control server 4 are illustrated for convenience of explanation. However, the number of information processing devices 1, the number of bus vehicles 2, and the number of the control servers 4 are not limited to this. For example, the processes executed by the information processing device 1 according to the present embodiment may be executed by a plurality of the information processing devices 1 disposed in a distributed manner. The information processing device 1 may be capable of communicating with the plurality of bus vehicles 2 and the plurality of control servers 4.

Figure 4:
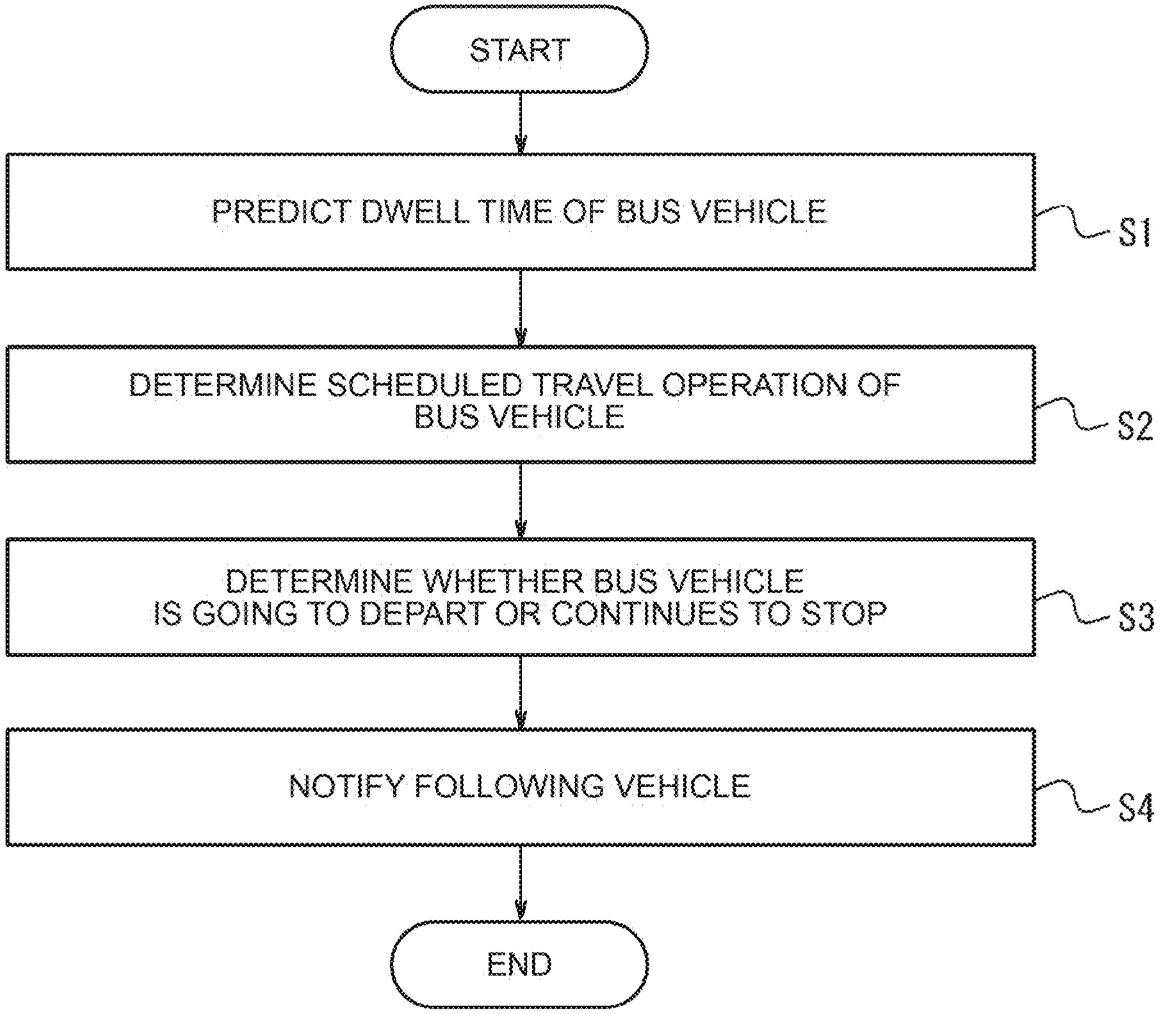
FIG. 4 is a flowchart illustrating an operation of the information processing device.

The information processing device 1 can execute the processing described with reference to FIG. 4. As an alternative embodiment, the information processing device 1 may be communicably connected to a server that supports services by the business entity, and execute the processing described with reference to FIG. 4 in the server. Such a server may be installed, for example, in a facility dedicated to an entity or in a shared facility including a data center. Such a server may be referred to as a center server. In one embodiment, the information processing device 1 may be used to provide mobility-as-a-service (MaaS) that is a service utilizing mobility.

The bus vehicle 2 may include, for example, an in-vehicle monitoring system. The bus vehicle 2 can capture an image of the inside of the bus vehicle 2 via an imaging unit such as a camera installed in the bus vehicle 2. The captured image includes a still image or a moving image. In addition, the bus vehicle 2 can detect, for example, an open/close state of the getting-on/off door.

The control server 4 may be an operation management system that manages the operation of the bus vehicle 2. For example, the control server 4 can acquire and hold information such as a departure timetable, a travel route, and a current position of the bus vehicle 2. The control server 4 may have a reservation system capable of making a reservation for getting on and off the bus vehicle 2, or may cooperate with the reservation system. The control server 4 or the reservation system can acquire and retain reservation information about the bus vehicle 2, such as how many passengers/getters are at any bus stop, for example. The reservation information may include personal information such as the name and age of the reservation person.

Figure 3:
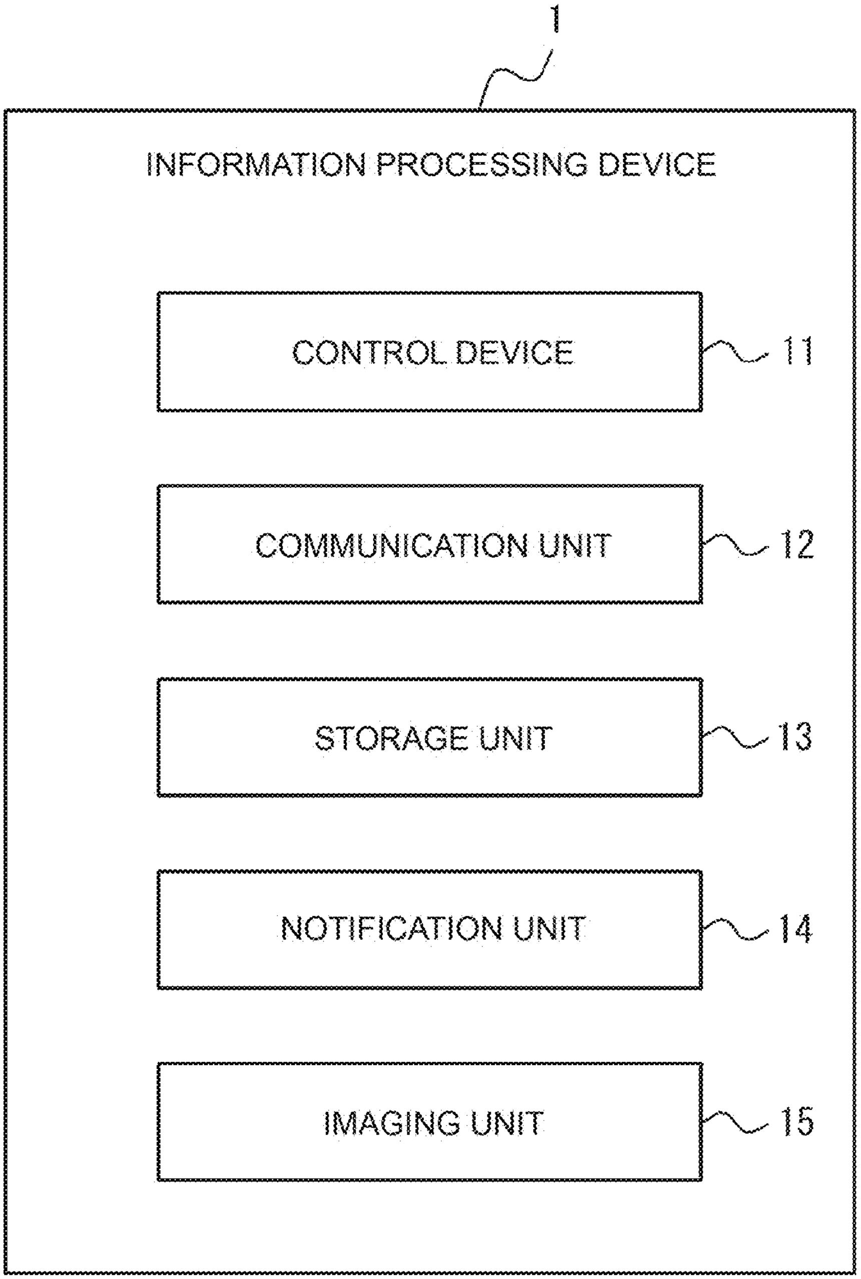
FIG. 3 is a block-diagram illustrating a configuration of an information processing device.

The internal configuration of the information processing device 1 will be described in detail with reference to FIG. 3.

The information processing device 1 includes a control unit 11, a communication unit 12, a storage unit 13, a notification unit 14, and an imaging unit 15. The constituent components of the information processing device 1 are connected so as to be able to communicate with each other via a dedicated line, for example.

The control unit 11 includes, for example, one or more general-purpose processors including a central processing unit (CPU) or a micro processing unit (MPU). The control unit 11 may include one or more dedicated processors specialized for a specific process. The control unit 11 may include one or more dedicated circuits instead of including the processor. The dedicated circuit may be, for example, a field-programmable gate array (FPGA) or an application-specific integrated circuit (ASIC). The control unit 11 may include an electronic control unit (ECU). The control unit 11 transmits and receives arbitrary information via the communication unit 12.

The communication unit 12 includes a communication module conforming to one or more wired or wireless local area network (LAN) standards for connecting to the network NW. The communication unit 12 may include a module conforming to one or more mobile communication standards such as the long term evolution (LTE), the fourth generation (4G), or the fifth generation (5G). The communication unit 12 may include a communication module or the like corresponding to one or more short-range communication standards or specifications including Bluetooth (registered trademark), AirDrop (registered trademark), or IrDA, ZigBee (registered trademark). The communication unit 12 may include a communication module or the like corresponding to one or more short-range communication standards or specifications, including Felica (registered trademark) or RFID. The communication unit 12 transmits and receives information via the network NW.

The storage unit 13 includes a semiconductor memory, a magnetic memory, an optical memory, or a combination of at least two of them. However, the disclosure is not limited to this. Examples of the semiconductor memory include a random access memory (RAM) or a read only memory (ROM). RAM is, for example, static random access memory (SRAM) or dynamic random access memory (DRAM). For example, the ROM is an electrically erasable programmable read only memory (EEPROM). The storage unit 13 may function as, for example, a main storage device, an auxiliary storage device, or a cache memory. The storage unit 13 may store information on the result of analysis or processing by the control unit 11. The storage unit 13 may store various kinds of information and the like related to the operation or control of the information processing device 1. The storage unit 13 may store a system program, an application program, embedded software, and the like. The storage unit 13 may be provided outside the information processing device 1 and accessed from the information processing device 1.

The notification unit 14 includes, for example, a display such as a radio communication interface or a LED display, a speaker, a light-emitting device, a projecting device, or a combination thereof, but is not limited thereto. The notification unit 14 may be provided outside the information processing device 1 and accessed from the information processing device 1. The notification unit 14 is used to notify the following vehicle 3 of information on traveling of the bus vehicle 2.

The imaging unit 15 includes a camera. The imaging unit 15 can image the surroundings including, for example, the bus vehicle 2, the passenger/passenger to the bus vehicle 2, and the following vehicle 3. The imaging unit 15 may record the captured image in the storage unit 13 or transmit the captured image to the control unit 11 for image analysis. The image may be analyzed by any image analysis technique. The image includes a still image or a moving image. The imaging unit 15 may be provided outside the information processing device 1 and accessed from the information processing device 1. The imaging unit 15 may simultaneously capture images in a plurality of directions, or may be provided in a plurality.

Hereinafter, a process executed by the information processing device 1 according to the present embodiment will be described in detail with reference to a flowchart of FIG. 4. Here, as an example, as illustrated in FIG. 1, a process for the information processing device 1 to notify the following vehicle 3 approaching from the rear of the bus vehicle 2 of information on traveling of the bus vehicle 2 that is stopped at the bus stop is described.

In S1, the information processing device 1 predicts the dwell time of the bus vehicle 2 stopped at the bus stop. The dwell time of the bus vehicle 2 is one of the information on traveling of the bus vehicle 2. An embodiment in which the information processing device 1 predicts the dwell time of the bus vehicle 2 is as follows.

(1) The control unit 11 may acquire an image captured by at least one of the imaging unit 15 and the imaging unit in the bus vehicle 2, detect the number of people getting on and off the bus vehicle 2 (the number of people getting on and off), and predict the dwell time based on the detected number of people getting on and off. The number of boarding passengers may be the number of passengers in a train waiting for boarding at a bus stop. The number of getting-off persons may be the number of getting-on/off doors or the number of getting-off waiting trains of getting-off doors. The number of boarding passengers and the number of alighting passengers may be weighted such that the time required for boarding is longer or shorter than the time required for alighting. The number of boarding passengers and the number of alighting passengers may be weighted according to the detected age, where the age of the passengers getting on and off is detected from the captured image, and for example, the infant and the elderly need time for boarding and alighting. Other specific examples include the following.

(1-1) The control unit 11 may predict the dwell time by determining a predetermined dwell time based on the detected number of passengers. For example, in the case of the bus vehicle 2 with one entrance/exit, the control unit 11 may determine a predetermined dwell time (for example, 5 minutes) with respect to the sum of the number of boarding passengers (for example, 3 passengers) and the number of alighting passengers (for example, 2 passengers) (for example, 5 passengers). Alternatively, the control unit 11 may determine a predetermined dwell time (for example, three minutes) for the number of boarding passengers (for example, three) and a predetermined dwell time (for example, two minutes) for the number of alighting passengers (for example, three). The sum of these dwell times (e.g., 5 minutes) may be determined as a dwell time. For example, in the case of the bus vehicle 2 with two entrances/exits, one for boarding and one for alighting, the control unit 11 may compare the number of boarding passengers (for example, three) with the number of alighting passengers (for example, two), and determine a predetermined dwell time (for example, three minutes) for the large number of passengers (for example, three). Alternatively, the control unit 11 may determine a predetermined dwell time (for example, three minutes) for the number of boarding passengers (for example, three) and a predetermined dwell time (for example, two minutes) for the number of alighting passengers (for example, three). These dwell times may be compared to determine the longer dwell time (e.g., 3 minutes) as a dwell time.

(1-2) The control unit 11 may predict the dwell time by multiplying the detected number of passengers by a predetermined time. For example, in the case of the bus vehicle 2 with only one entrance/exit, the control unit 11 may multiply the sum (for example, five) of the number of boarding passengers (for example, two) and the number of alighting passengers (for example, three) by a predetermined time (for example, one minute) to determine the dwell time (for example, five minutes). Alternatively, the control unit 11 may multiply the number of boarding passengers (for example, two) by a predetermined time (for example, one minute) and multiply the number of alighting passengers (for example, two) by a predetermined time (for example, 30 seconds), and determine the sum of the times (for example, three minutes) as the dwell time. For example, in the case of the bus vehicle 2 with two entrances/exits, one for boarding and one for alighting, the control unit 11 may compare the number of boarding passengers (for example, three) and the number of alighting passengers (for example, two), and multiply the large number of passengers (for example, three) by a predetermined time (for example, one minute) to determine the dwell time (for example, three minutes). Alternatively, the control unit 11 may multiply the number of boarding passengers (for example, four) by a predetermined time (for example, one minute) and multiply the number of alighting passengers (for example, four) by a predetermined time (for example, 30 seconds), compare the times, and determine the longer time (for example, four minutes) as the dwell time.

(2) In the case of the bus vehicle 2 that has introduced the reservation system, the control unit 11 may acquire, from the control server 4 or the reservation system, the number of persons (the number of reserved pick-up/drop-off passengers) the reserved bus vehicle 2 via the communication unit 12. The control unit 11 may predict the dwell time based on the number of reserved pick-up/drop-off passengers. The number of reserved pick-up/drop-off passengers may be at least one of the number of passengers who made a pickup reservation for the bus vehicle 2 and the number of passengers who made a drop-off reservation for the bus vehicle 2. The prediction of the dwell time may be performed, for example, in the same manner as in (1).

(3) The control unit 11 may predict the dwell time by acquiring, from the control server 4, a departure time table of the bus vehicle 2 via the communication unit 12, determining the planned departure time from the departure time table, and calculating a difference between the current time and the planned departure time. As an alternative embodiment, the control unit 11 may request the control server 4 to set the scheduled departure time of the bus vehicle 2 and receive the scheduled departure time to predict the dwell time.

(4) The control unit 11 may acquire the past dwell time of the bus vehicle 2 from the control server 4 via the communication unit 12, and predict the dwell time based on the acquired past dwell time. More specifically, the following examples are given.

(4-1) The control unit 11 may predict the dwell time from the past dwell time results. More specifically, the dwell time may be predicted from an average of past dwell times. For example, in the case of the bus vehicle 2 operating between seven and eight o'clock, the dwell time of the bus vehicle 2 may be predicted by calculating an average of the dwell times during which the bus vehicle operated between seven and eight o'clock has stopped in the past.

(4-2) The control unit 11 may predict the dwell time by considering constraints such as time, weather, and road congestion information in the past dwell time. For example, the control unit 11 may calculate the dwell time by performing machine learning on a relationship between data such as time, weather, and road congestion information and the dwell time.

In S2, the information processing device 1 may determine a scheduled travel operation after the bus vehicle 2 departs the bus stop. The scheduled travel operation may be one piece of information on traveling of the bus vehicle 2. For example, route information may be acquired from the bus vehicle 2 or the control server 4 via the communication unit 12 to determine the scheduled travel operation of the bus vehicle 2. The determination of the scheduled travel operation of the bus vehicle 2 may be performed, for example, by determining that the bus vehicle 2 performs either a right turn or a left turn within a predetermined distance based on the acquired route information. The predetermined distance may be 500 m, long, and 1 km, for example. The information indicating the scheduled travel operation of the bus vehicle 2 may be, for example, information indicating that the bus vehicle 2 is scheduled to perform either a right turn or a left turn after starting, such as "scheduled right turn after starting".

In S3, the information processing device 1 may determine whether the bus vehicle 2 is going to depart or continues to stop. The information may be one piece of the information on traveling of the bus vehicle 2. The information may be, for example, information indicating "departing" or "stopping" for the bus vehicle 2. An embodiment in which the information processing device 1 determines the information is as follows.

(1) The control unit 11 may acquire an image captured by at least one of the imaging unit 15 and the imaging unit in the bus vehicle 2, detect a passenger getting on the bus vehicle 2, and determine whether the person getting on the bus vehicle 2 has finished riding. The control unit 11 may determine that the bus vehicle 2 departs when it is determined that the person getting on the bus vehicle 2 has finished riding on the bus vehicle 2 or that the train waiting for boarding at the bus stop has disappeared. When determining that the person getting on the bus vehicle 2 has not finished riding, the control unit 11 may determine that the bus vehicle is not going to depart or continues to stop because the bus vehicle is getting on or off. This may be performed in a bus vehicle 2 with one entrance/exit through which alighting passengers get off first and then boarding passengers get on, or in a bus vehicle 2 that performs only boarding. As an alternative embodiment, it can likewise be implemented by detecting a passenger getting off the bus vehicle 2 in the bus vehicle 2 that performs only alighting.

(2) In addition to (1) above, the control unit 11 may acquire an image captured by at least one of the imaging unit 15 and the imaging unit in the bus vehicle 2. The control unit 11 may detect a person who gets off the bus vehicle 2 and further determine whether or not the person who gets off the bus vehicle 2 has finished getting off. If it is further determined that the person who gets off the bus vehicle 2 finishes getting off, it may be determined that the bus vehicle 2 departs. When it is further determined that the person getting off from the bus vehicle 2 has not finished getting off, it may be determined that the bus vehicle 2 is not going to depart or continues to stop because the bus vehicle is getting off. This may be carried out in a bus vehicle 2 with two entrances/exits, one for boarding and one for alighting.

(3) The control unit 11 may acquire an image captured by at least one of the imaging unit 15 and the imaging unit in the bus vehicle 2, detect an open/close state of the getting on/off door of the bus vehicle 2, and determine whether the getting on/off door of the bus vehicle 2 is closed. The control unit 11 may determine that the bus vehicle 2 departs when it is determined that the getting-on/off door of the bus vehicle 2 is closed. When determining that the getting-on/off door of the bus vehicle 2 is not closed, the control unit 11 may determine that the bus vehicle 2 is not going to depart or continues to stop. In the case of a bus vehicle 2 with two entrances/exits, one for boarding and one for alighting, the entrance/exit door may include a boarding door and an alighting door. The same applies to (4) described later.

(4) The control unit 11 may determine that the bus vehicle 2 departs when information indicating that the getting-on/off door is closed is received from the bus vehicle 2 via the communication unit 12. When the control unit 11 receives the information indicating that the getting-on/off door is opened from the bus vehicle 2, it may determine that the bus vehicle 2 is not going to depart or continues to stop.

(5) In the case of the bus vehicle 2 in which the reservation system has been introduced, the control unit 11 may acquire the number of persons reserved for getting on and off the reserved bus vehicle 2 (the number of persons reserved for getting on and off) from the control server 4 or the reservation system. In the case of the bus vehicle 2 in which the reservation system has been introduced, the control unit 11 may count the number of people getting on and off the bus vehicle 2 (the number of people getting on and off) from the image captured by at least one of the imaging unit 15 and the imaging unit in the bus vehicle 2, and determine whether or not the number of people getting on and off matches the number of people getting on and off. The control unit 11 may determine that the bus vehicle 2 departs when it is determined that the number of the passenger-on/off reservation matches the number of passengers-on/off reservation. When the control unit 11 determines that the number of reserved passengers does not match the number of passengers, it may be determined that the bus vehicle 2 is not going to depart or continues to stop.

As an additional embodiment, the information processing device 1 may determine that at least one of the persons who are on or off the bus vehicle 2, or that the passenger on or off the bus vehicle 2 has been completed. The information may be one piece of the information on traveling of the bus vehicle 2. The embodiment in which the information processing device 1 determines the information may be determined in the same manner as in S3. Such information may be, for example, information indicating "getting on," "getting off," "getting on and off," "getting off," "getting on and off," "getting on and off," or a combination thereof.

As an additional embodiment, the information processing device 1 may determine information indicating at least one of the number of people getting on the bus vehicle 2 and the number of people getting off the bus vehicle 2. The information regarding the number of persons may be one piece of the information on traveling of the bus vehicle 2. In the embodiment in which the information processing device 1 determines the information, the control unit 11 may acquire and detect an image captured by at least one of the imaging unit 15 and the imaging unit in the bus vehicle 2, the number of people getting on the bus vehicle 2 and the number of people getting off the bus vehicle 2. Alternatively, in the case of the bus vehicle 2 in which the reservation system has been introduced, the number of passengers getting on and off the bus vehicle 2 and the number of passengers getting on and off the bus vehicle 2 may be the number of passengers getting on and off the reserved bus vehicle (the number of passengers getting on and off). The information about the number of persons may be, for example, information indicating "five boarding passengers", "two alighting passengers" or "five boarding passengers, two alighting passengers" or the like.

In S4, the information processing device 1 notifies the following vehicle 3 traveling behind the bus vehicle 2 of information on traveling of the bus vehicle 2 via the notification unit 14. The notification by the notification unit 14 may be performed by, for example, display on a display, voice transmission by a speaker, and light transmission by a light-emitting device. An example of the notification by the information processing device 1 is as follows.

(1) The control unit 11 may notify the information by projecting the information on the road surface or displaying the information on the road surface via a projection device or the like that uses light such as projection mapping. There is a technique of projecting on a road surface so as to be visible even during the daytime, but it may be projected on the road surface so as to be visible even during the daytime, by installing a roof on the upper part of the road or using an appropriate color. Further, the control unit 11 may change the display position based on the position of the following vehicle 3. At least one of the vehicle height, the speed, the traveling direction, and the like of the following vehicle 3 may be detected from the image captured by the imaging unit 15. Based on the result of the detection, the control unit 1 may change the drawing position so that the display position is in front of the following vehicle 3, and more specifically, the display position may be changed to a position where the line of sight of the driver of the following vehicle 3 enters.

(2) When a light, a tile, a display, or the like that emits light is embedded in a road surface, the control unit 11 may transmit a command for displaying a character string, a symbol, a figure, or the like on the road surface using the embedded light, the tile, the display, or the like via a wireless communication interface or the like. The instruction may include changing the position to be displayed on the road surface based on the position of the following vehicle 3, as described in (1).

As a modification of the present embodiment, at least one of S2 and S3 is optional. That is, the information processing device 1 may not execute at least one of S2 and S3. As an additional variation of the present embodiment, the order of S3 from S1 may be interchanged.

As described above, according to the present embodiment, the operation of the control unit 11 of the information processing device 1 includes predicting the dwell time of the bus vehicle 2 that is stopped at the bus stop station, and notifying the following vehicle 3 that is traveling behind the bus vehicle 2 of information on traveling of the bus vehicle 2 including the dwell time via the notification unit 14. With this configuration, the information processing device 1 can contribute to the improvement of the traffic safety of the bus vehicle 2 and the following vehicle 3 by supporting the determination of whether or not to overtake the bus vehicle 2 or whether or not to safely overtake the bus vehicle 2 by the following vehicle 3.

Further, according to the present embodiment, the notification by the notification unit 14 is performed by displaying on the road surface. Generally, in the notification by the display, the driver of the following vehicle 3 may not be aware of the device on which the display is mounted or of the display itself. Further, the notification by the speaker is, for example, a notification by a sound such as "please be careful" or a warning sound or a warning sound, and the amount of information that can be emitted from the speaker may be limited. With the above configuration, the information processing device 1 can notify the driver of the following vehicle 3 to recognize more information than those.

Further, according to the present embodiment, the operation of the control unit 11 of the information processing device 1 includes determining the scheduled travel operation of the bus vehicle 2 after the bus vehicle 2 departed the bus stop, and the information on traveling of the bus vehicle 2 includes information indicating the scheduled travel operation. In general, since the traveling speed of the bus vehicle 2 is slow, the following vehicle 3 tries to overtake the bus vehicle 2 from the side (from the right side or from the left side). For example, the following vehicle 3 is notified of information indicating that the bus vehicle 2 is scheduled to perform either a right turn or a left turn after starting. Accordingly, it is possible to cause the following vehicle 3 to recognize at least one of the following: that the bus vehicle 2 is scheduled to perform either a right turn or a left turn immediately after starting the vehicle; and that the bus vehicle 2 will perform a lane change after starting the vehicle in order to perform either a right turn or a left turn. Accordingly, since the following vehicle 3 can assume that the bus vehicle 2 does not come from the front of the following vehicle 3 immediately after starting, it is possible to cause the following vehicle 3 to determine not to overtake the bus vehicle 2. This determination can cause the following vehicle 3 to reduce or prevent unsafe or unnecessary passing of the following vehicle 3, for example. Therefore, the information processing device 1 can contribute to further improvement in traffic safety of the bus vehicle 2 and the following vehicle 3.

Further, according to the present embodiment, the operation of the control unit 11 of the information processing device 1 includes determining whether the bus vehicle 2 is going to depart or continues to stop, and the information on traveling of the bus vehicle 2 includes the information indicating whether the bus vehicle 2 is going to depart or continues to stop. With this configuration, the information processing device 1 can notify the following vehicle 3 of the information on traveling of the bus vehicle 2 in more detail. Further, with this configuration, the information processing device 1 supports the determination of whether or not to overtake the bus vehicle 2 or whether or not to safely overtake the bus vehicle 2 by the following vehicle 3. With this configuration, the information processing device 1 can contribute to further improvement in traffic safety of the bus vehicle 2 and the following vehicle 3.

Further, according to the present embodiment, the information processing device 1 is installed by a road on which the bus vehicle 2 and the following vehicle 3 travel. With this configuration, the information processing device 1 can smoothly acquire information and smoothly cooperate with the bus vehicle 2 and the following vehicle 3.

Although the present disclosure has been described above based on the drawings and the embodiment, it should be noted that those skilled in the art may make various modifications and alterations thereto based on the present disclosure. Other changes may be made without departing from the scope of the present disclosure. For example, the functions included in each means or step can be rearranged so as not to be logically inconsistent, and a plurality of means or steps can be combined into one or divided.

For example, in the above embodiment, a program that executes all or part of the functions or processes of the information processing device 1 can be recorded in a computer-readable recording medium. The computer-readable recording medium includes a non-transitory computer-readable medium such as a magnetic recording device, an optical disc, a magneto-optical recording medium, or a semiconductor memory. Distribution of the program is performed, for example, by selling, transferring, or lending a portable recording medium such as a digital versatile disc (DVD) or a Compact Disc Read Only Memory (CD-ROM) in which the program is recorded. Further, the distribution of the program may be performed by storing the program in a storage of a server and transmitting the program from the server to another computer. Further, the program may be provided as a program product. The present disclosure can also be realized as a program that can be executed by a processor.

What is claimed is:

1. An information processing device comprising:

a display;

a speaker;

a light-emitting device;

a projecting device;

a camera configured to capture images of one or more first passengers getting on a bus, one or more second passengers getting off the bus, and a following vehicle traveling behind the bus; and a processor configured to acquire the images from the camera, detect the number of the one or more first passengers and the number of the one or more second passengers based on the acquired images, detect age of the one or more first passengers and the one or more second passengers based on the acquired images, determine a dwell time of the bus stopped at a bus stop based on the number of the one or more first passengers, the number of the one or more second passengers, and the age of the one or more first passengers and the one or more second passengers, and notify the following vehicle of bus traveling information including the dwell time via at least one of the display, the speaker, the light-emitting device, or the projecting device, wherein the number of the one or more first passengers includes a number of one or more passengers waiting at the bus stop, and the number of the one or more second passengers includes a number of one or more passengers waiting in front of an alighting door of the bus on the bus.

2. The information processing device according to claim 1, wherein the processor is further configured to cause the projecting device to project the bus traveling information on a road surface.

3. The information processing device according to claim 1, wherein:

the processor is further configured to determine a scheduled travel operation of the bus after the bus departs the bus stop; and the bus traveling information includes information indicating the scheduled travel operation.

4. The information processing device according to claim 1, wherein:

the processor is further configured to determine whether the bus is going to depart or continues to stop; and the bus traveling information includes information indicating whether the bus is going to depart or continues to stop.

5. The information processing device according to claim 1, wherein the information processing device is installed by a road on which the bus and the following vehicle travel.

6. A method for providing mobility-as-a-service using the information processing device according to claim 1.

7. The information processing device according to claim 1, wherein the processor is further configured to cause the display to display the bus traveling information.

8. The information processing device according to claim 1, wherein the processor is further configured to cause the speaker to output the bus traveling information.

9. The information processing device according to claim 1, wherein the processor is further configured to cause the light-emitting device to output the bus traveling information.

10. The information processing device according to claim 1, wherein the processor is further configured to apply weighting to the number of the one or more first passengers and the number of the one or more second passengers based on the detected ages.

11. The information processing device according to claim 1, wherein the processor is further configured to apply weighting to the number of the one or more first passengers and the number of the one or more second passengers under the condition where time required to get on the bus is longer than time required to get off the bus.

12. The information processing device according to claim 1, wherein the processor is further configured to apply weighting to the number of the one or more first passengers and the number of the one or more second passengers under the condition where time required to get on the bus is shorter than time required to get off the bus.

13. The information processing device according to claim 4, wherein the processor is further configured to:

determine whether the one or more first passengers have finished getting on the bus based on the number of the one or more first passengers;

determine that the bus departs in response to the determination that the one or more first passengers have finished getting on the bus; and determine that the bus continues to stop in response to the determination that the one or more first passengers have not finished getting on the bus.

14. The information processing device according to claim 4, wherein the processor is further configured to:

determine whether the one or more second passengers have finished getting off the bus based on the number of the one or more second passengers;

determine that the bus departs in response to the determination that the one or more second passengers have finished getting off the bus; and determine that the bus continues to stop in response to the determination that the one or more second passengers have not finished getting off the bus.

15. The information processing device according to claim 4, wherein the processor is further configured to:

detect an open state of the alighting door based on the acquired images;

determine whether the alighting door is closed based on the detected open state;

determine that the bus departs in response to the determination that the alighting door is closed; and determine that the bus continues to stop in response to the determination that the alighting door is not closed.

16. The information processing device according to claim 13, wherein the alighting door serves as a boarding door through which the one or more second passengers get off and the one or more first passengers get on.

17. The information processing device according to claim 14, wherein the bus further includes one boarding door.

* * * * *